Figure 1:
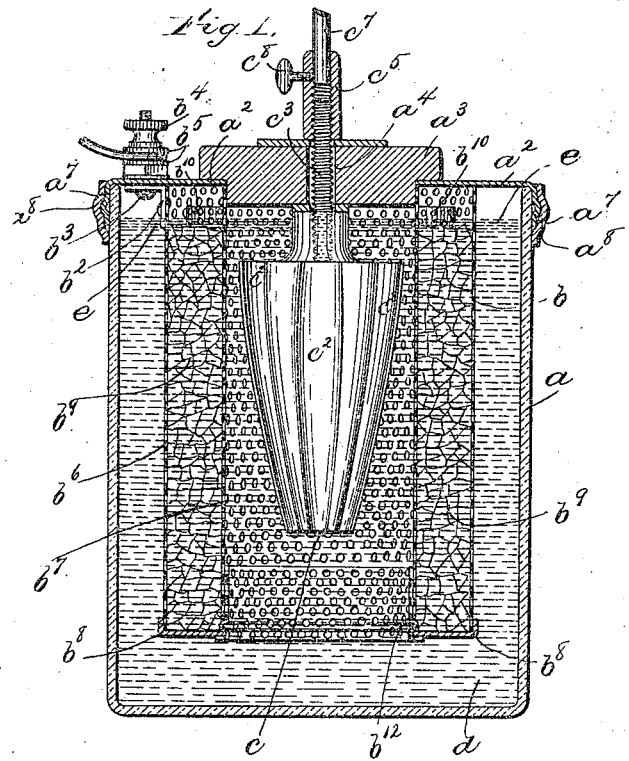

(No Model.) 2 Sheets—Sheet 1.

R. W. GORDON.
GALVANIC BATTERY.

No. 542,049. Patented July 2, 1895.

Witnesses
Jas. J. Maloney.

Inventor,
Ralph W. Gordon
by Jos. P. Livermore
Atty (No Model.) 2 Sheets—Sheet 2.

R. W. GORDON.
GALVANIC BATTERY.

No. 542,049. Patented July 2, 1895.

Witnesses
Jas. J. Maloney
J. H. Livermore

Inventor.
Ralph W. Gordon
by Jos. P. Livermore
Att'y

UNITED STATES PATENT OFFICE.

RALPH W. GORDON, OF BOSTON, MASSACHUSETTS.

GALVANIC BATTERY.

SPECIFICATION forming part of Letters Patent No. 542,049, dated July 2, 1895.

Application filed January 31, 1895. Serial No. 536,762. (No model.)

*To all whom it may concern:*

Be it known that I, RALPH W. GORDON, of Boston, county of Suffolk, State of Massachusetts, have invented an Improvement in Galvanic Batteries, of which the following description, in connection with the accompanying drawings, is a specification, like letters on the drawings representing like parts.

The present invention relates to galvanic batteries and is embodied in a cell of improved construction, in which the positive and negative elements and the depolarizing agent are arranged to obtain the greatest possible output of current with a minimum deterioration caused by the action of the battery.

The materials used in the battery forming the subject of this invention may be such as have been heretofore used in certain classes of batteries and are preferably zinc, as the active metal or positive element, copper or iron as the negative element, and black oxide of copper as the depolarizing agent, all being immersed in an exciting fluid, preferably a solution of caustic soda. The batteries heretofore used embodying these agencies have been objectionable, as the arrangement has been such that the materials resulting from decomposition of the active agents have formed deposits that interfere with the free action of the battery, or in some cases short circuits have been formed in the battery, thus rapidly consuming the active materials thereof and detracting from the current to be utilized in the external circuit. The present invention aims to obviate these difficulties and at the same time to greatly simplify the construction of the cell, the arrangement, moreover, being such that the exciting fluid can permeate through the depolarizing agent from all directions, the said depolarizing agent being supported in a receptacle which in itself forms the negative element of the battery, thus reducing the number of parts to be constructed.

To attain these ends, the cell which forms the subject of the present invention consists, mainly, of a jar adapted to be filled with the exciting fluid, the said jar being provided with a cover from which are suspended the positive element, consisting of a piece of zinc, and the negative element, which consists of a perforated metallic receptacle in which the depolarizing material, preferably black oxide of copper, is contained, the said depolarizing material thus being accessible to the action of the exciting fluid from all sides, and in order to increase the surface of the negative element and depolarizing material exposed to the direct action of the exciting fluid the space within the perforated receptacle, constituting the negative element, is provided with hollow perforated chambers, preferably extending from one wall to another thereof, thus practically dividing the said receptacle into a number of compartments which contain the depolarizing agent and are substantially surrounded on all sides by the exciting fluid.

Figure 2:
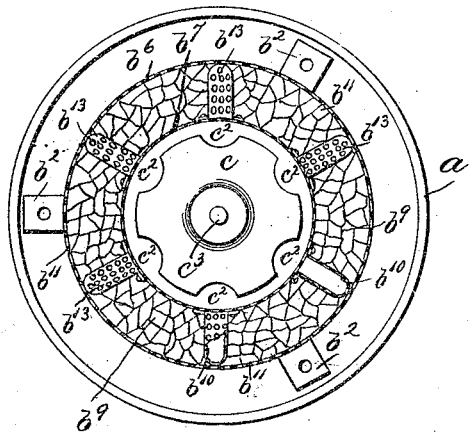
Figure 3:
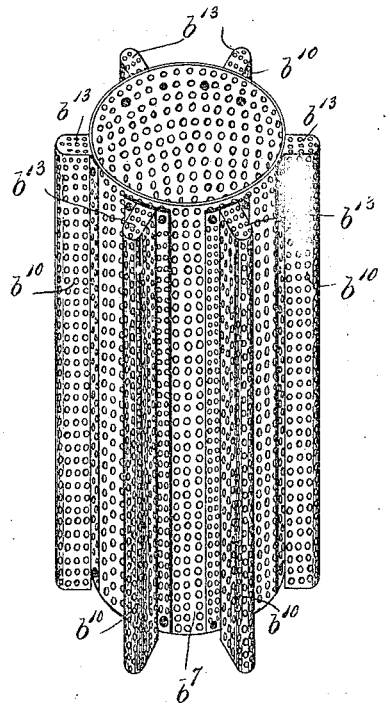
Figure 4:
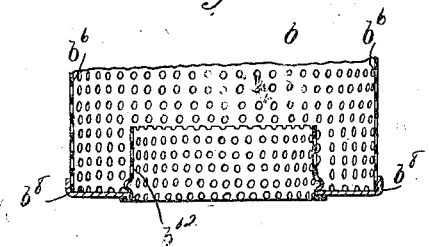

Figure 1 is a sectional elevation of the preferred form of battery embodying this invention; Fig. 2, a top plan view of the battery with the cover removed and with one of the hollow partitions shown in section; Fig. 3, a perspective view of the cylinder forming the inner wall of the chamber which constitutes the negative element, and Fig. 4 a detail showing a portion of the lower end of the perforated receptacle in section.

A jar or receptacle $a$, preferably cylindrical in form, which may be of any material not affected by the action of a solution of caustic soda, glass being usually used, is employed to contain the various agents which make up the complete cell.

The depolarizing agent, which consists of particles of black oxide of copper, is contained in a perforated receptacle $b$, which is preferably metallic, and forms the negative element of the battery, the said receptacle being suspended within the jar $a$ in any suitable way, it being preferable, however, to secure it to the cover $a^2$ of said jar by means of ears or lugs $b^2$ riveted or otherwise secured to the walls of the said receptacle and fastened to the under side of said cover by means of screws $b^3$ passing upward through said cover and secured, as by a nut and washer, on the outer surface thereof, thus rendering the said receptacle readily detachable from the cover. The external circuit wire may be connected with one of the said supports $b^3$ by a suitable clamping-nut $b^4$ whereby it is preferably held between two washers $b^5$, as shown in Fig. 1, the said support and nut constituting the positive pole of the battery.

The perforated receptacle constituting the negative element has concentric outer and inner perforated walls $b^6$ $b^7$ connected at their lower end by an annular plate $b^8$, thus making the receptacle of annular form, the space between its inner and outer perforated walls being filled with the black oxide of copper $b^9$ for the depolarizing agent of the battery. A central space or well is thus formed within the inner wall of the annular receptacle, which contains the positive element $c$, which is a mass of zinc, preferably of the form shown in Figs. 1 and 2, supported in said central well concentric with the walls thereof. The surface of said positive element $c$ is preferably fluted, as shown at $c^2$, in order to afford a greater surface for the action of the exciting fluid. The annular receptacle thus formed, having perforated walls on both sides, is capable of being thoroughly permeated by the exciting fluid, which thus has access to the surface of nearly every particle of the depolarizing agent. It is obvious, however, that the outside particles of the mass—that is, those next to the walls of the receptacle—are in the most intimate relation to the fluid and to the material of the said receptacle itself, and it is desirable, therefore, to increase, so to speak, the wall-area of the receptacle. To this end hollow perforated chambers $b^{10}$ are provided within the receptacle, thus forming spaces for the free access of the depolarizing agent, and the said chambers preferably extend from the inner wall $b^7$ to the outer wall $b^6$, thus practically dividing the receptacle into a number of spaces $b^{11}$, each of which has perforated walls, so that the surface of the depolarizing agent contained therein is exposed to a larger degree to the action of the exciting fluid than would otherwise be the case. In constructing the receptacle $b$ the inner wall or cylinder is preferably made separate and the chambers $b^{10}$ are U-shaped, the edges of the open sides thereof being riveted or otherwise secured to said wall, while the outer wall of the receptacle is provided with a bottom $b^8$, having a central opening and a short upwardly-extending supplemental wall $b^{12}$ extending upward from the edge of said opening, around which wall the lower end of the inner wall of the receptacle is adapted to fit when in place. The whole receptacle $b$ is thus very simple and easily constructed, the two parts thereof being readily assembled, since the chambers $b^{10}$ serve to center the inner wall $b^7$ when it is put in place in the outer wall of the receptacle, it being obvious, however, that this specific construction is not essential to the invention. The chambers $b^{10}$ are provided at the top with covers $b^{13}$ to prevent the depolarizing agent from passing down through them into the main cell of the battery, especially while the receptacle is being filled. By this construction the contact-surface between the metallic walls constituting the negative electrode and the exciting fluid and the surface through which said exciting fluid has direct access to the depolarizing agent is largely increased, the area of surface through which the exciting liquid passes to the depolarizer being practically increased by the combined area of the walls of all the said chambers $b^{10}$.

After the parts thus far described are in place, the jar $a$ is nearly filled with a solution of caustic soda $d$, the said solution forming the exciting fluid. Since the receptacle $b$ is perforated, it is obvious that the exciting fluid may permeate the same and come in contact with each particle of the depolarizing agent contained therein, and while metallic copper is set free by the action of the battery, thus tending to copper-plate the negative element, the said metallic copper is deposited on the surface of the perforated receptacle $b$, and it has been found in practice that while the said receptacle $b$ becomes, as it were, copper-plated, sufficient copper is not deposited thereon to fill up the perforations, so that the oxide of copper is exposed to the action of the exciting fluid until it becomes entirely reduced to metallic copper. During the action of the battery the zinc element $c$ becomes gradually dissolved, it being found, however, that the action takes place mainly at the top, owing to the fact that a percentage of oxide of zinc is given off and held in solution, and since the said solution is heavier than the solution of caustic soda it sinks toward the bottom of the bath, the upper portion of the bath, therefore, being purer and consequently more active in attacking the zinc. It is necessary, therefore, in order that the zinc may be fully utilized to provide means for preventing the action of the battery, in dissolving the upper portion of the zinc, from breaking the supporting connection of said zinc with the cover, as would be the case if a simple rod, cylinder, or strip of zinc were connected at its upper end to the cover. Such result is accomplished in accordance with the present invention, as follows: The zinc element $c$ is supported by a suspending rod $c^3$, which may be of copper, and which extends axially some distance into the upper end of the zinc $c$, as shown in dotted lines, Fig. 1, said rod being preferably enlarged or headed or screw-threaded or scored, as shown, so that when the zinc is cast upon the rod the latter becomes firmly embedded therein. The said suspending rod $c^3$ passes through an opening in the cover $a^2$ and is secured in an insulating-plug $a^3$, which may be of wood, by means of a binding-socket $c^5$, constituting the negative pole of the battery, to which the external conductor may be connected. The opening in the cover $a^2$ is preferably made, as shown, of sufficient size to admit of the insertion of the zinc $c$, and the insulating-plug $a^3$ is made in the form of a cover for said opening. In order to secure the zinc $c$ to the said insulating-plug, an opening $a^4$ is provided in the center thereof, through which the suspending rod $c^3$ is passed, the upper portion of said rod being then secured to the binding-socket $c^5$ by screw-threads or otherwise, and the binding-socket being of a diameter larger than that of the opening $a^4$, so that it is supported upon the top of the plug $a^3$. By this construction the zinc $c$ may be removed from the battery, if desired, without removing the cover $a^2$ by simply lifting out the plug $a^3$ with the zinc attached thereto.

The external negative conductor $c^7$ may be suitably secured in the binding-socket $c^5$, as by a thumb-screw $c^8$.

The zinc $c$ preferably surrounds the suspender $c^3$ up to the under surface of the insulating-plug $a^3$, and thereby protects said suspender from the action of the battery solution; and inasmuch as the consumption of zinc by the action of the battery increases toward the upper surface of the exciting fluid, as before pointed out, the zinc is made in the conoidal form shown, being of greater diameter at the level of the upper surface of the exciting fluid, and tapering toward its lower end, so that it will be consumed by the gradual reduction of its sides without substantially diminishing its length until used up to such an extent as to require the substitution of a new zinc. It is found, also, that the best results are secured by terminating the zinc at some distance above the lower end of the perforated receptacle constituting the negative element.

The materials exposed to the action of the battery fluid are either of such nature as not to be injured by the caustic soda, or may be treated by amalgamation, so as not to be injuriously affected thereby.

It is essential for the best operation of a battery in which a solution of caustic soda is employed, as the exciting fluid, that the said solution should be entirely protected from the air, since it otherwise becomes deteriorated by the absorption of carbonic-acid gas therefrom. For this reason the cover $a^2$ is tightly secured to the top of the receptacle $a$, said cover being shown as of sheet metal having a rim $a^7$, which fits down over the upper edge of the receptacle $a$, and is tightly sealed by a rubber band $a^8$ stretched around the same and lapping over from the rim of the cover onto the side of the receptacle $a$.

In order to completely protect the active parts of the battery from contact with air, it is preferable to pour in, after all the elements are in place, a small amount of mineral oil, indicated at $e$, which floats on the top of the solution $d$, and effectually prevents the absorption of any deleterious gases from the air by said solution. Any mineral oil may be used for this purpose; but it has been found best in practice to use paraffine oil.

I claim—

1. In a battery cell the combination with a jar containing a solution of caustic soda, of a cover for said jar fitting tightly thereon and having a central opening and plug of insulating material therein, a perforated receptacle secured to the under side of said cover and extending downward into the said solution and having concentric inner and outer walls and containing oxide of copper between said walls, and a positive element consisting of a mass of zinc suspended in said solution from the said insulating plug in the cover, substantially as described.

2. In a battery cell, the combination with a jar containing an exciting fluid; of a negative element consisting of a receptacle containing a depolarizing agent and having empty chambers therein, the walls of said receptacle and chambers being perforated for the better permeation of said exciting fluid; and a positive element in said exciting fluid, substantially as described.

3. A negative element for a battery cell composed of concentric cylindrical perforated walls and a bottom piece closing the space between said walls, combined with hollow chambers extending from one of said walls into said space, said chambers being composed of U-shaped perforated strips connected at their open ends to one of said cylindrical walls, said element being adapted to contain depolarizing material, substantially as described.

4. A negative element for a battery cell composed of concentric cylindrical perforated walls and a bottom piece closing the space between said walls, combined with hollow chambers composed of U-shaped perforated strips interposed between said cylindrical walls and having the space between their side walls covered at the top, substantially as and for the purpose described.

5. The herein described negative battery element consisting of an outer perforated wall having a bottom piece with a central opening therein and a short supplemental wall extending upward from the edge of said opening, combined with an inner perforated wall having perforated chambers extending outward from the outer surface thereof, and adapted to be inserted within said outer wall and to fit around said supplemental wall, as described.

In testimony whereof I have signed my name to this specification in the presence of two subscribing witnesses.

RALPH W. GORDON.

Witnesses:
M. E. HILL,
H. J. LIVERMORE.